United States Patent
Sridhar et al.

(10) Patent No.: US 8,873,135 B2
(45) Date of Patent: Oct. 28, 2014

(54) EXTENDED DYNAMIC RANGE OPTICAL AMPLIFIER

(71) Applicants: Balakrishnan Sridhar, Ellicott City, MD (US); Jun Bao, Ellicott City, MD (US)

(72) Inventors: Balakrishnan Sridhar, Ellicott City, MD (US); Jun Bao, Ellicott City, MD (US)

(73) Assignee: Ciena Corporation, Hanover, MD (US)

(*) Notice: Subject to any disclaimer, the term of this patent is extended or adjusted under 35 U.S.C. 154(b) by 90 days.

(21) Appl. No.: 13/724,610

(22) Filed: Dec. 21, 2012

(65) Prior Publication Data

US 2014/0177037 A1    Jun. 26, 2014

(51) Int. Cl.
*H04B 10/293*    (2013.01)
*H01S 3/067*    (2006.01)
*H04B 10/291*    (2013.01)
*H01S 3/10*    (2006.01)
*H01S 3/094*    (2006.01)
*H01S 3/16*    (2006.01)
*H01S 3/00*    (2006.01)

(52) U.S. Cl.
CPC ........ *H01S 3/06758* (2013.01); *H04B 10/2916* (2013.01); *H04B 10/293* (2013.01); *H01S 3/1003* (2013.01); *H01S 3/094084* (2013.01); *H01S 3/1608* (2013.01); *H01S 3/0064* (2013.01); *H01S 3/0078* (2013.01); *H04B 10/291* (2013.01); *H01S 2301/02* (2013.01); *H04B 2210/003* (2013.01)
USPC .................... 359/341.44; 359/334; 359/337.4

(58) Field of Classification Search
CPC ........................ H04B 10/2916; H04B 10/293
USPC .................. 359/334, 337.4, 341.44
See application file for complete search history.

(56) References Cited

U.S. PATENT DOCUMENTS

| | | | | |
|---|---|---|---|---|
| 5,340,979 A | * | 8/1994 | Baney et al. | 250/214 B |
| 5,521,751 A | * | 5/1996 | Aida et al. | 359/337 |
| 5,696,707 A | * | 12/1997 | Hentschel et al. | 702/69 |
| 5,778,118 A | * | 7/1998 | Sridhar | 385/24 |
| 5,781,322 A | * | 7/1998 | Uchiyama et al. | 398/38 |
| 5,801,879 A | * | 9/1998 | Burton et al. | 359/341.2 |
| 5,940,208 A | * | 8/1999 | Blaszyk et al. | 359/337.5 |
| 6,049,413 A | | 4/2000 | Taylor et al. | |
| 6,057,959 A | | 5/2000 | Taylor et al. | |

(Continued)

FOREIGN PATENT DOCUMENTS

| | | |
|---|---|---|
| WO | 99/43107 A1 | 8/1999 |
| WO | 99/50937 A1 | 10/1999 |

*Primary Examiner* — Ari M Diacou
(74) *Attorney, Agent, or Firm* — Clements Bernard PLLC; Christopher L. Bernard; Lawrence A. Baratta, Jr.

(57) ABSTRACT

An extended dynamic range optical amplifier, a method of operation, and a line amplifier configuration include an optical amplifier that can be optimized for high or low span loss conditions by switching an internal stage in or out of an internal light path within the amplifier. The extended dynamic range optical amplifier can include a low gain mode and a high gain mode with an internal switch to switch out a gain mid-stage in a low gain mode to extend the useful dynamic range of the amplifier. Further, the extended dynamic range optical amplifier can use residual pump power from an initial stage to pump the gain mid-stage in the high gain mode. Additionally, the extended dynamic range optical amplifier includes remapping of gain in the initial stage and the gain mid-stage to optimize the amplifier noise performance based on the maximum output power of the amplifier.

16 Claims, 7 Drawing Sheets

(56) References Cited

U.S. PATENT DOCUMENTS

| | | | | |
|---|---|---|---|---|
| 6,061,171 | A | 5/2000 | Taylor et al. | |
| 6,069,731 | A * | 5/2000 | Bayart | 359/341.41 |
| 6,178,038 | B1 | 1/2001 | Taylor et al. | |
| 6,204,958 | B1 | 3/2001 | Taylor et al. | |
| 6,215,581 | B1 * | 4/2001 | Yadlowsky | 359/337 |
| 6,341,032 | B1 * | 1/2002 | Fukashiro et al. | 359/337 |
| 6,366,395 | B1 | 4/2002 | Drake et al. | |
| 6,426,833 | B1 | 7/2002 | Bao | |
| 6,462,861 | B2 * | 10/2002 | Ohshima et al. | 359/334 |
| 6,535,331 | B2 * | 3/2003 | Shiota et al. | 359/341.32 |
| 6,621,625 | B1 * | 9/2003 | Zhang et al. | 359/341.42 |
| 6,671,085 | B2 * | 12/2003 | So et al. | 359/341.42 |
| 6,747,788 | B2 * | 6/2004 | Kinoshita | 359/334 |
| 6,747,790 | B2 * | 6/2004 | Onaka et al. | 359/337 |
| 6,751,011 | B2 * | 6/2004 | Sakurai | 359/333 |
| 6,760,152 | B2 | 7/2004 | Ratoff et al. | |
| 6,839,162 | B2 * | 1/2005 | Sekiya et al. | 359/337.4 |
| 6,900,931 | B1 | 5/2005 | Sridhar et al. | |
| 6,934,479 | B2 * | 8/2005 | Sakamoto et al. | 398/193 |
| 7,038,841 | B2 * | 5/2006 | Chang et al. | 359/334 |
| 7,075,711 | B2 | 7/2006 | Haggans et al. | |
| 7,369,300 | B2 | 5/2008 | Sridhar et al. | |
| 7,400,443 | B1 | 7/2008 | Sridhar et al. | |
| 7,453,628 | B2 | 11/2008 | Onaka et al. | |
| 7,508,577 | B2 * | 3/2009 | Benz et al. | 359/337.2 |
| 7,512,343 | B2 | 3/2009 | Sridhar et al. | |
| 7,856,037 | B2 | 12/2010 | Gurusami et al. | |
| 8,233,215 | B2 | 7/2012 | Bao | |
| 8,306,425 | B2 | 11/2012 | Yang et al. | |
| 8,422,121 | B2 * | 4/2013 | Itoh et al. | 359/337.13 |
| 8,488,233 | B2 * | 7/2013 | Huang et al. | 359/337.21 |
| 2001/0050807 | A1 * | 12/2001 | Deguchi et al. | 359/341.44 |
| 2002/0041431 | A1 * | 4/2002 | Ohshima et al. | 359/334 |
| 2002/0044336 | A1 * | 4/2002 | Tanaka et al. | 359/334 |
| 2003/0021009 | A1 | 1/2003 | MacCormack et al. | |
| 2004/0042063 | A1 * | 3/2004 | Ohtani et al. | 359/341.3 |
| 2004/0156094 | A1 * | 8/2004 | Kawahara et al. | 359/333 |
| 2005/0286119 | A1 | 12/2005 | Wysocki et al. | |
| 2006/0139742 | A1 | 6/2006 | Frankel et al. | |
| 2006/0269287 | A1 * | 11/2006 | Bidmead et al. | 398/130 |
| 2009/0225402 | A1 * | 9/2009 | Wysocki et al. | 359/337.4 |
| 2010/0129081 | A1 * | 5/2010 | Onaka | 398/81 |
| 2010/0134875 | A1 * | 6/2010 | Mori | 359/334 |
| 2010/0315702 | A1 * | 12/2010 | Itoh et al. | 359/341.33 |
| 2010/0329695 | A1 | 12/2010 | Sridhar | |
| 2011/0085231 | A1 * | 4/2011 | Bolshtyansky et al. | 359/341.33 |
| 2011/0116159 | A1 * | 5/2011 | Wysocki et al. | 359/337.1 |

* cited by examiner

EXTENDED DYNAMIC RANGE OPTICAL AMPLIFIER

FIELD OF THE DISCLOSURE

The present disclosure relates generally to fiber optic systems and methods. More particularly, the present disclosure relates to extended dynamic range optical amplifiers such as Erbium Doped Fiber Amplifiers (EDFAs).

BACKGROUND OF THE DISCLOSURE

Optical amplifiers that amplify optical signals, i.e. wavelength division multiplexing signals (WDM), etc., without the need to convert the optical signals to an electrical signal. EDFAs include optical fiber doped with erbium along with associated pump lasers. Distributed Raman amplifiers utilize in-line optical fiber with associated pump lasers. Existing EDFAs use a mid-stage variable optical attenuator (VOA) to achieve variable gain operation. The variable gain operation allows the EDFAs to operate with a flat gain response over the entire bandwidth over a range of gain settings. However, the useful dynamic range, where the noise figure (NF) of the amplifier does not increase significantly with the reduction in gain, is limited to about 5 dB in conventional amplifiers. In real networks, there is a large variability or spread in the span losses. This usually requires use of multiple types of EDFA modules optimized at different gain points or use of a sub-optimal EDFA module to limit the number of module types. Disadvantageously, multiple types of EDFA modules leads to increased sparing requirements, complex manufacturing, and the like. The other factors that complicate the design are that the EDFA modules may be coupled in two directions in order to reduce the footprint. Other factors such as the presence of Distributed Raman Amplifiers whose gain is dependent of fiber type and quality increase the spread in required gain values.

It would be advantageous to have an EDFA module that could account for the large variability or spread in the span loss in actual network deployments while streamlining network operations and manufacturing requirements.

BRIEF SUMMARY OF THE DISCLOSURE

In an exemplary embodiment, an extended dynamic range optical amplifier includes a first gain stage configured to receive an input signal; a first optical switch configured to receive an output of the first gain stage and to switch the output of the first gain stage to one of a first output and a second output; a second gain stage connected to the first output and configured to receive the output of the first gain stage based on a configuration of the first optical switch; a second optical switch including a first input connected to an output of the second gain stage and a second input connected to the second output of the first optical switch, wherein the second optical switch is configured to provide a single output; and a third gain stage configured to receive the single output from the second optical switch. Pursuant to settings of the first optical switch and the second optical switch, the extended dynamic range optical amplifier can be configured to operate in a high gain mode of operation and a low gain mode of operation. The extended dynamic range optical amplifier can further include control circuitry configured to control operation of the first optical switch, the second optical switch, the first gain stage, the second gain stage, and the third gain stage; wherein the control circuitry is configured to set the first optical switch and the second optical switch such that the second gain stage is in line with the first gain stage and the third gain stage in a high gain mode of operation and to set the first optical switch and the second optical switch such that the second gain stage is out of line with the first gain stage and the third gain stage in a low gain mode of operation. The control circuitry can be further configured to selectively increase gain associated with the first gain stage and selectively reduce gain associated with the second gain stage and/or the third gain stage when the extended dynamic range optical amplifier is operating below an associated maximum power.

The control circuitry can be further configured to, responsive to operation in the low gain mode of operation in a cooperative manner with a Raman amplifier, detect a failure of the Raman amplifier; and, responsive to the failure of the Raman amplifier, switch to the high gain mode of operation. The control circuitry can be further configured to select appropriate operating parameters of the first optical switch, the second optical switch, the first gain stage, the second gain stage, and the third gain stage cooperatively with and/or without a Raman amplifier. The extended dynamic range optical amplifier can further include a pump in the first gain stage; and a residual pump bypass from the pump in the first gain stage to the second gain stage, wherein the second gain stage utilizes residual power from the pump in the first gain stage in lieu of having a pump contained therein. The extended dynamic range optical amplifier can further include a variable optical attenuator disposed between the output of the first gain stage and the first optical switch configured to perform selective attenuation. The extended dynamic range optical amplifier can further include a gain flattening filter at an input of the second gain stage configured to incrementally perform gain flattening. The extended dynamic range optical amplifier can further include erbium doped fiber in each of the first gain stage, the second gain stage, and the third gain stage. The extended dynamic range optical amplifier can include a dynamic range of about 5 dB to 25 dB.

In another exemplary embodiment, a method of operating an extended dynamic range optical amplifier includes selecting a mode of operation for the extended dynamic range optical amplifier including one of a low gain mode and a high gain mode; responsive to selecting the low gain mode, selectively omitting a second gain stage in the extended dynamic range optical amplifier and amplifying an input signal with a first gain stage and a third gain stage; and, responsive to selecting the high gain mode, selectively including the second gain stage between the first gain stage and the second gain stage and amplifying the input signal with each of the first gain stage, the second gain stage, and the third gain stage. The method can further include selectively omitting or selectively including the second gain stage via a first optical switch and a second optical switch. The method can further include selectively increasing gain associated with the first gain stage and selectively reducing gain associated with the second gain stage and/or the third gain stage when the extended dynamic range optical amplifier is operating below an associated maximum power. The method can further include, responsive to operation in the low gain mode in a cooperative manner with a Raman amplifier, detecting a failure of the Raman amplifier; and, responsive to the failure of the Raman amplifier, switching to the high gain mode. The method can further include operating a pump in the first gain stage; in the high gain mode, using residual pump power from the pump for the second gain stage thereby operating the second gain stage without a pump contained therein.

In yet another exemplary embodiment, a line amplifier configuration includes an extended dynamic range optical amplifier supporting a first fiber and a second fiber, wherein, for each of the first fiber and the second fiber, the extended dynamic range optical amplifier includes a first gain stage configured to receive an input signal; a first optical switch configured to receive an output of the first gain stage and to switch the output of the first gain stage to one of a first output and a second output; a second gain stage connected to the first output and configured to receive the output of the first gain stage based on a configuration of the first optical switch; a second optical switch including a first input connected to an output of the second gain stage and a second input connected to the second output of the first optical switch, wherein the second optical switch is configured to provide a single output; and a third gain stage configured to receive the single output from the second optical switch; wherein the extended dynamic range optical amplifier is configured to selectively operate in one of a low gain mode and a high gain mode for each of the first fiber and the second fiber. The extended dynamic range optical amplifier can be configured based on a first operating regime, a second operating regime, and a third operative regime based on a combination of span loss of each of the first fiber and the second fiber and fiber type of each of the first fiber and the second fiber; in the first operating regime, the extended dynamic range optical amplifier is operated in the low gain mode without a Raman amplifier; in the second operating regime, the extended dynamic range optical amplifier is operated in one of the low gain mode with a Raman amplifier and the high gain mode without a Raman amplifier; and, in the third operating regime, the extended dynamic range optical amplifier is operated in the high gain mode with a Raman amplifier. In the low gain mode with a Raman amplifier, the extended dynamic range optical amplifier can be configured to detect a failure of the Raman amplifier and switch to the high gain mode based thereon. In the high gain mode, the extended dynamic range optical amplifier can be configured to utilize residual pump power from the first gain stage for the second gain stage in lieu of having a pump contained therein.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, an extended dynamic range optical amplifier such as an Erbium Doped Fiber Amplifier (EDFAs) is disclosed. The extended dynamic range optical amplifier can be optimized for high or low span loss conditions by switching an internal stage in or out of an internal light path within the amplifier. Advantageously, equipment manufacturers, network operators, etc. can deploy a single module despite having variability in span losses in actual networks. The extended dynamic range optical amplifier can include a low gain mode and a high gain mode with an internal switch to switch out a gain mid-stage in a low gain mode to extend the useful dynamic range of the amplifier. Further, the extended dynamic range optical amplifier can use residual pump power from an initial stage to pump the gain mid-stage in the high gain mode. For example, in the high gain mode, input power to the first stage is low for the pumps. Advantageously, this eliminates the need for additional pumps to pump the gain mid-stage. Additionally, the extended dynamic range optical amplifier includes remapping of gain in the initial stage and the gain mid-stage to optimize the amplifier noise performance based on the maximum output power of the amplifier. This improves the noise performance of the amplifier for non-zero dispersion shifted fibers (NZDSF), where the Raman gain is high and the EDFA gain is low. This improvement could be applicable to all multi-stage amplifiers and not just a switched amplifier such as the extended dynamic range optical amplifier.

Figure 1:
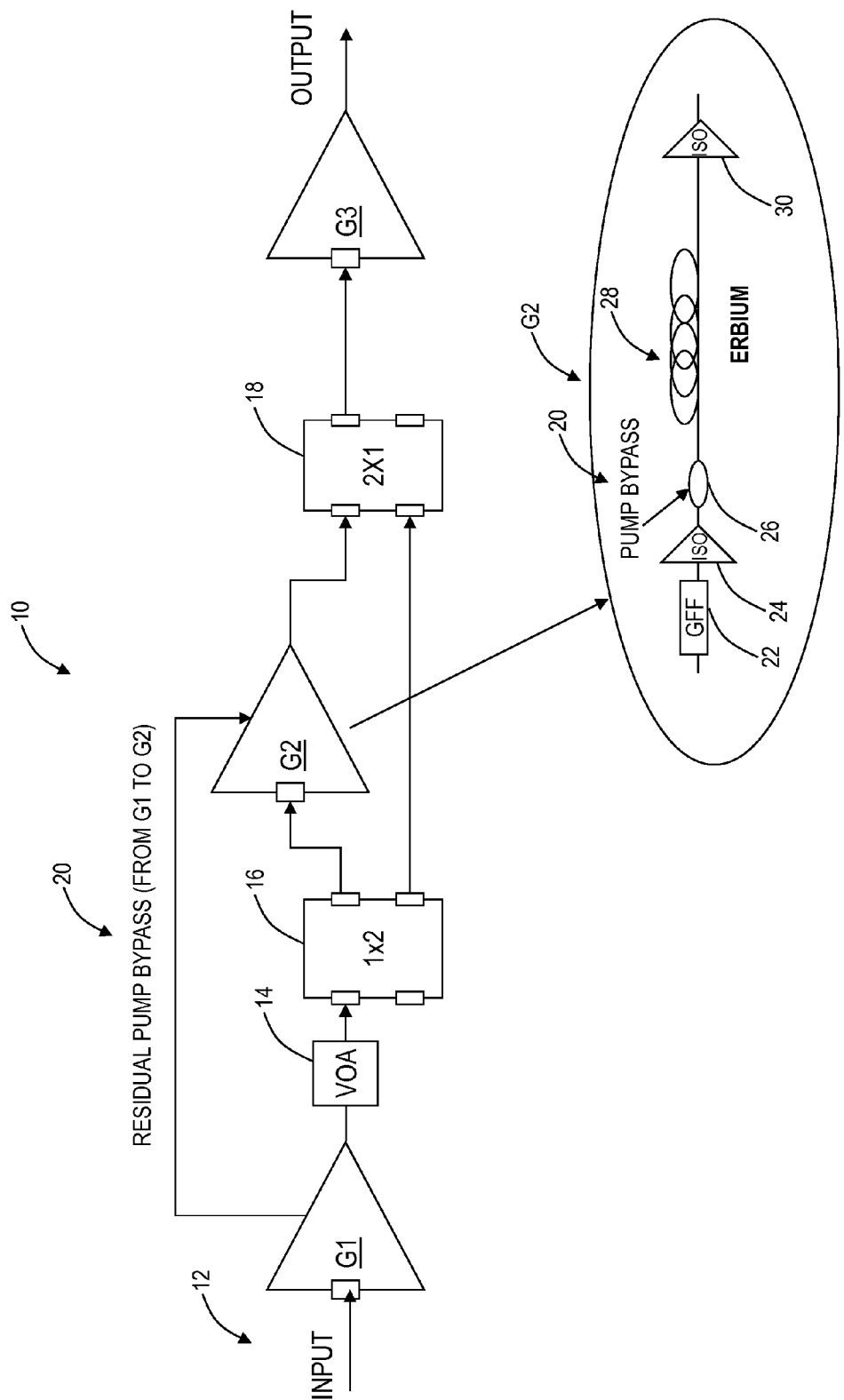
FIG. 1 is a block diagram of an extended dynamic range optical amplifier.

Referring to FIG. 1, in an exemplary embodiment, a block diagram illustrates an extended dynamic range optical amplifier 10. The extended dynamic range optical amplifier 10 includes multiple gain stages G1, G2, G3. Each of the gain stages G1, G2, G3 can also include one or more stages therein. In implementation, the gain stages G1, G2, G3 can include erbium doped fiber, pump lasers, isolators, gain flattening filters (GFF), and other optoelectronic components. Conventionally, EDFA amplifiers are constructed through two logical stages with mid-stage access therebetween. For example, this could include the gain stages G1, G3. In these conventional EDFA amplifiers, amplifier maximum gain is selected to cover a large percentage of span losses with a single amplifier per direction per most deployed fiber. In an exemplary embodiment, this could include amplifier maximum gain between 20-25 dB. In another exemplary embodiment, a conventional EDFA amplifier could have amplifier maximum gain of 23.5 dB, and the useful dynamic range of this amplifier is between about 16 to 23.5 dB. At lower gain levels, the increase in the mid-stage VOA value causes the noise figure of this conventional EDFA amplifier to increase rapidly. Often, use of Raman Amplifier in networks requires better performance at the low gain region.

To extend the dynamic range, the extended dynamic range optical amplifier 10 includes the gain stage G2 in between the gain stages G1, G3 in a switchable configuration. That is, the gain stage G2 is a switchable gain stage to improve the dynamic range of the extended dynamic range optical amplifier 10 and improve the noise performance of the extended dynamic range optical amplifier 10 in a low gain region. The gain stage G1 is a first gain stage including erbium doped fiber, pumps, etc. and receiving an input 12 including one or more optical signals. An output of the gain stage G1 is connected to a VOA 14 for selective attenuation thereof. An output of the VOA 14 connects to a 1×2 optical switch 16 configured to selectively switch the output of the VOA 14 to one of two outputs of the 1×2 optical switch 16. A first output of the 1×2 optical switch 16 is connected to the gain stage G2, and a second output of the 1×2 optical switch 16 is connected to a 2×1 optical switch 18. The 2×1 optical switch 18 receives inputs from the gain stage G2 and the 1×2 optical switch 16 and selectively outputs a single output therefrom to the gain stage G3. The configuration of the 2×1 optical switch 18 is complimentary to the configuration of the 1×2 optical switch 16, i.e. when the 1×2 optical switch 16 is set to input to the gain stage G2, the 2×1 optical switch 18 is configured to output from the gain stage G2, and when the 1×2 optical switch 16 is set to input direct to the 2×1 optical switch 18, the 2×1 optical switch 18 is configured to output from the 1×2 optical switch 16.

The gain stage G2 can include a residual pump bypass 20 from the gain stage G1 where the pumps in the gain stage G1 are also used to pump the gain stage G2. Advantageously, the residual pump bypass 20 eliminates the requirement for separate pump components in the gain stage G2. The gain stage G2 can include a gain flattening filter 22 at an input configured to selectively and adaptively flatten a gain spectrum of various optical signals input into the gain stage G2. The gain flattening filter 22 can connect to an optical isolator 24 which prevents back reflections from the gain stage G2. Subsequent to the optical isolator 24, the gain stage G2 can include an input port 26 receiving the residual pump bypass 20. The input port 26 and the residual pump bypass 20 provide pump lasers to erbium doped fiber 28 in the gain stage G2 which serves as a gain medium for the gain stage G2. Subsequent to the erbium doped fiber 28, the gain stage G2 includes another optical isolator 30 again configured to prevent back reflections into the erbium doped fiber 28.

Operationally, the extended dynamic range optical amplifier 10 includes two modes of operation, a low gain mode of operation and a high gain mode of operation. Accordingly, the extended dynamic range optical amplifier 10 has an extended dynamic range across both of these modes, e.g. a 5-25 dB dynamic range instead of a conventional 16-23.5 dB dynamic range. In the low gain mode of operation, only the gain stages G1, G3 stages are used. That is, in the low gain mode of operation, the 1×2 optical switch 16 is configured to switch out the gain stage G2 by sending the output from the VOA 14 directly to the 2×1 optical switch 18. The low gain mode of operation, using the gain stages G1, G3, is optimized for a low gain range and an exemplary maximum gain setting can be 15 dB. In an exemplary embodiment, the extended dynamic range optical amplifier 10 can have a useful dynamic range between about 8 and 15dB in this low gain mode of operation.

In the high gain mode of operation, the gain stage G2 is included to provide gain along with the gain stages G1, G3. That is, in the high gain mode of operation, the 1×2 optical switch 16 is configured to switch in the gain stage G2 by sending the output from the VOA 14 to the gain stage G2 prior to the 2×1 optical switch 18. As described herein, residual power from the gain stage G1 can fed to the gain stage G2 via the residual pump bypass 20. This is because, in the high gain mode of operation, the input 12 power to the extended dynamic range optical amplifier 10 is lower, i.e. the high gain mode of operation is used for longer and/or higher loss spans resulting in the input 12 having lower power, and hence there is more residual pump power in the gain stage G1. For efficiency, space savings, and cost reduction, the residual pump power is used to pump the gain stage G2. In the high gain mode of operation, the extended dynamic range optical amplifier 10 can have a useful dynamic range between about 15 and 25 dB.

Figure 2:
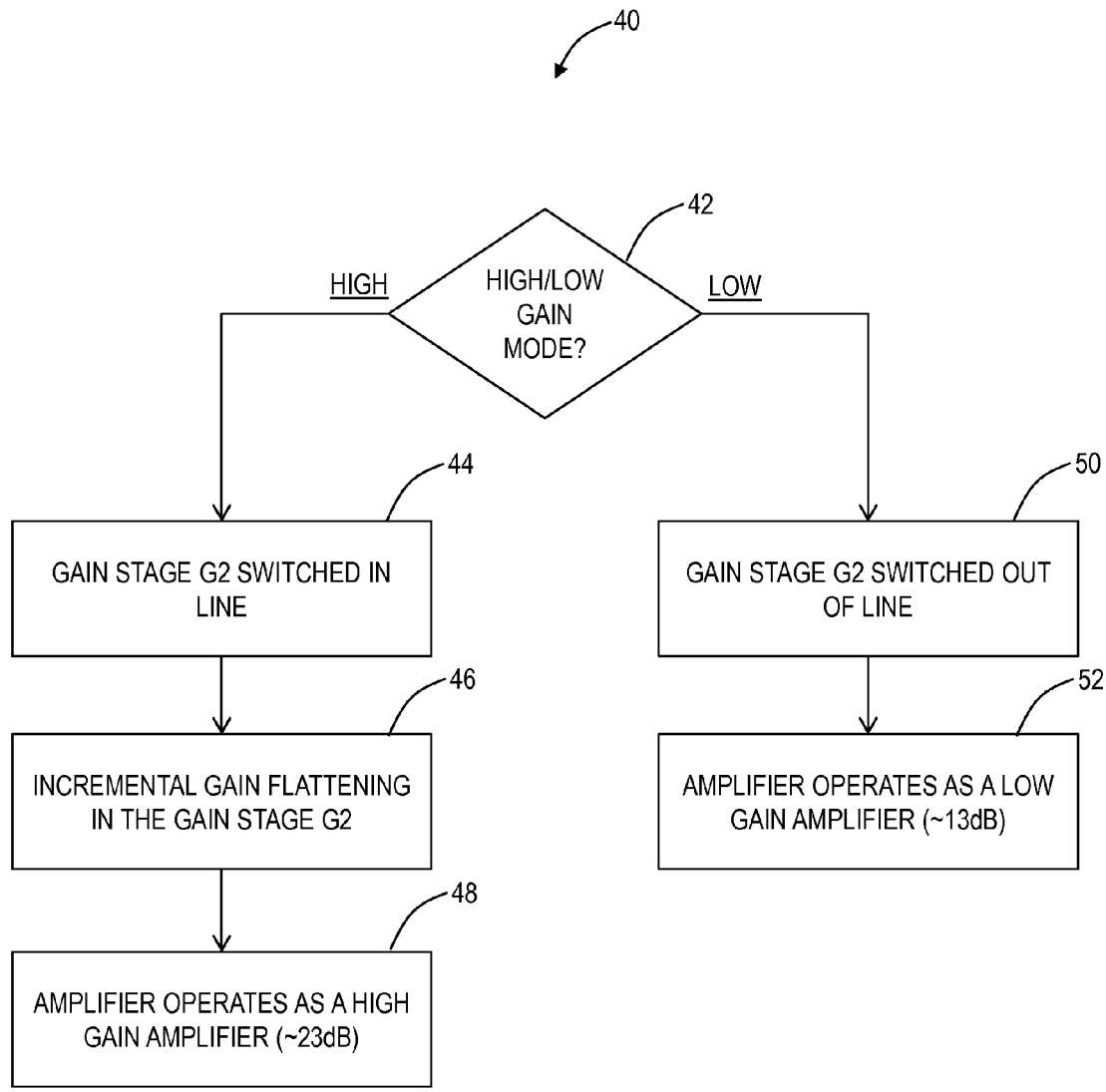
FIG. 2 is a flowchart of an operational method for the extended dynamic range optical amplifier of FIG. 1.

Referring to FIG. 2, in an exemplary embodiment, a flowchart illustrates an operational method 40 for the extended dynamic range optical amplifier 10. Note, in addition to the components illustrated in FIG. 1, the extended dynamic range optical amplifier 10 can include other components which are omitted for illustration purposes. For example, the extended dynamic range optical amplifier 10 can include control circuitry configured to control operation of the various components in the extended dynamic range optical amplifier 10. The operational method 40 includes setting a mode of operation, high or low, of the extended dynamic range optical amplifier 10 (step 42). Responsive to setting to the high mode, the operational method 40 includes the gain stage G2 being switched in line (step 44). The gain stage G2 includes incremental gain flattening (step 46). This gain flattening in the gain stage G2 is additional to gain flattening in either or both of the gain stages G1, G3. In the high mode, the extended dynamic range optical amplifier 10 operates as a high gain amplifier, such as about 23 dB (step 48).

Responsive to the low mode, the operational method 40 switches the gain stage G2 out of line (step 50). In the low mode, the extended dynamic range optical amplifier 10 operates as a low gain amplifier, such as about 13 dB (step 52). Note, the operational method 40 can be performed any time during operation of the extended dynamic range optical amplifier 10. For example, with the proliferation of Raman amplifiers and the widespread variation of span losses in actually deployed networks, network operators need wide ranges of amplification. It is expected that the extended dynamic range optical amplifier 10 can provide complementary deployment with and without Raman amplifiers enabling gain specific to requirements with suitable dynamic range. Further, the operational method 40 and the extended dynamic range optical amplifier 10 enable network operators to minimize different module or line card deployments making engineering and operations more efficient.

Figure 3:
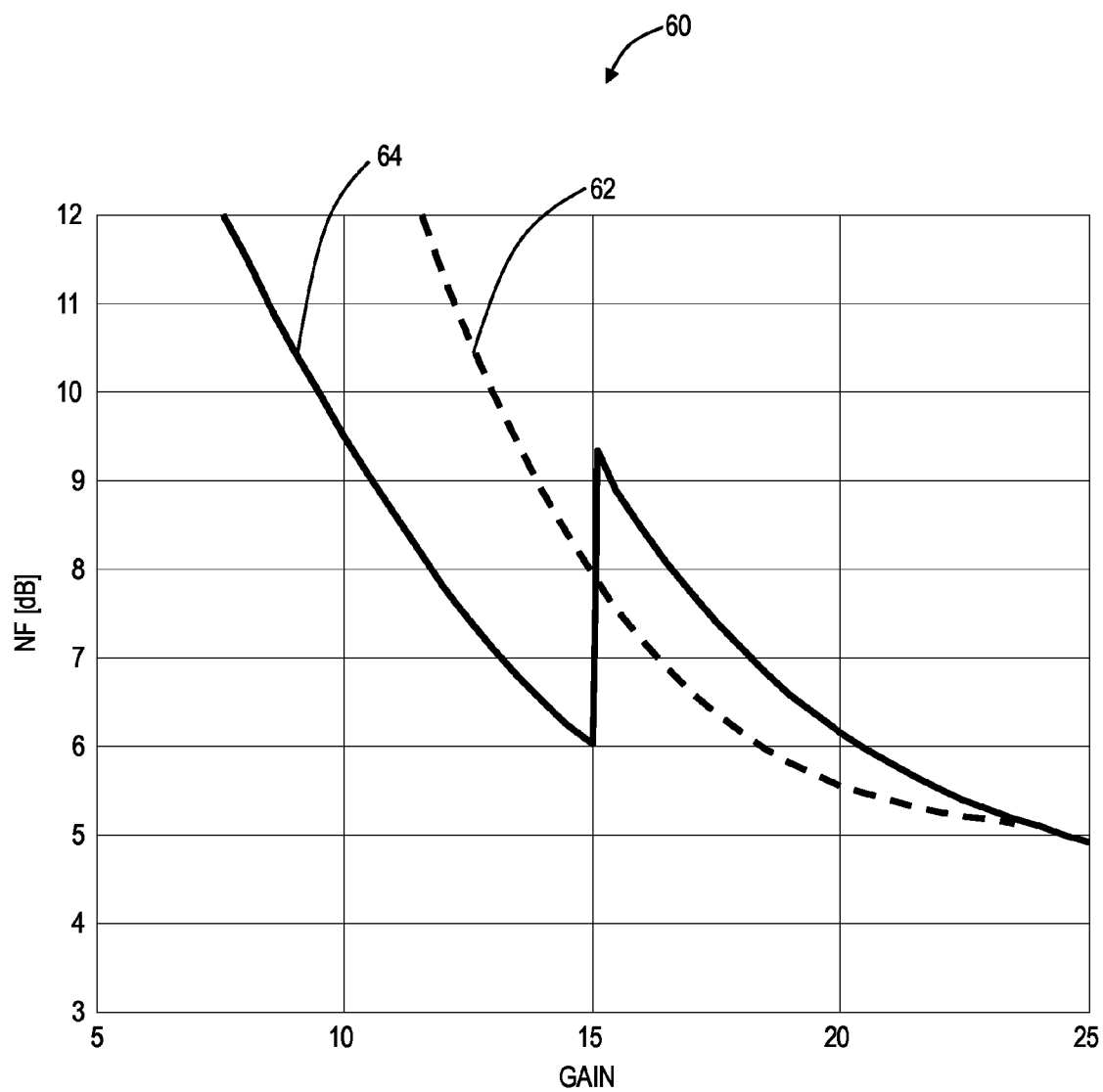
FIG. 3 is a graph of a comparison between noise figure of a conventional EDFA versus noise figure of the extended dynamic range optical amplifier of FIG. 1.

Referring to FIG. 3, in an exemplary embodiment, a graph 60 illustrates a comparison between noise FIG. 62 of a conventional EDFA versus noise FIG. 64 of the extended dynamic range optical amplifier 10. As can be seen in the graph 60, the noise FIG. 64 of the extended dynamic range optical amplifier 10 experiences a discontinuity at about 15 dB which is where the gain stage G2 is switched in line. As such, the dynamic range of the extended dynamic range optical amplifier 10 is extended enabling support for varying span losses as well as being complimentary with Raman amplifiers.

Figure 4:
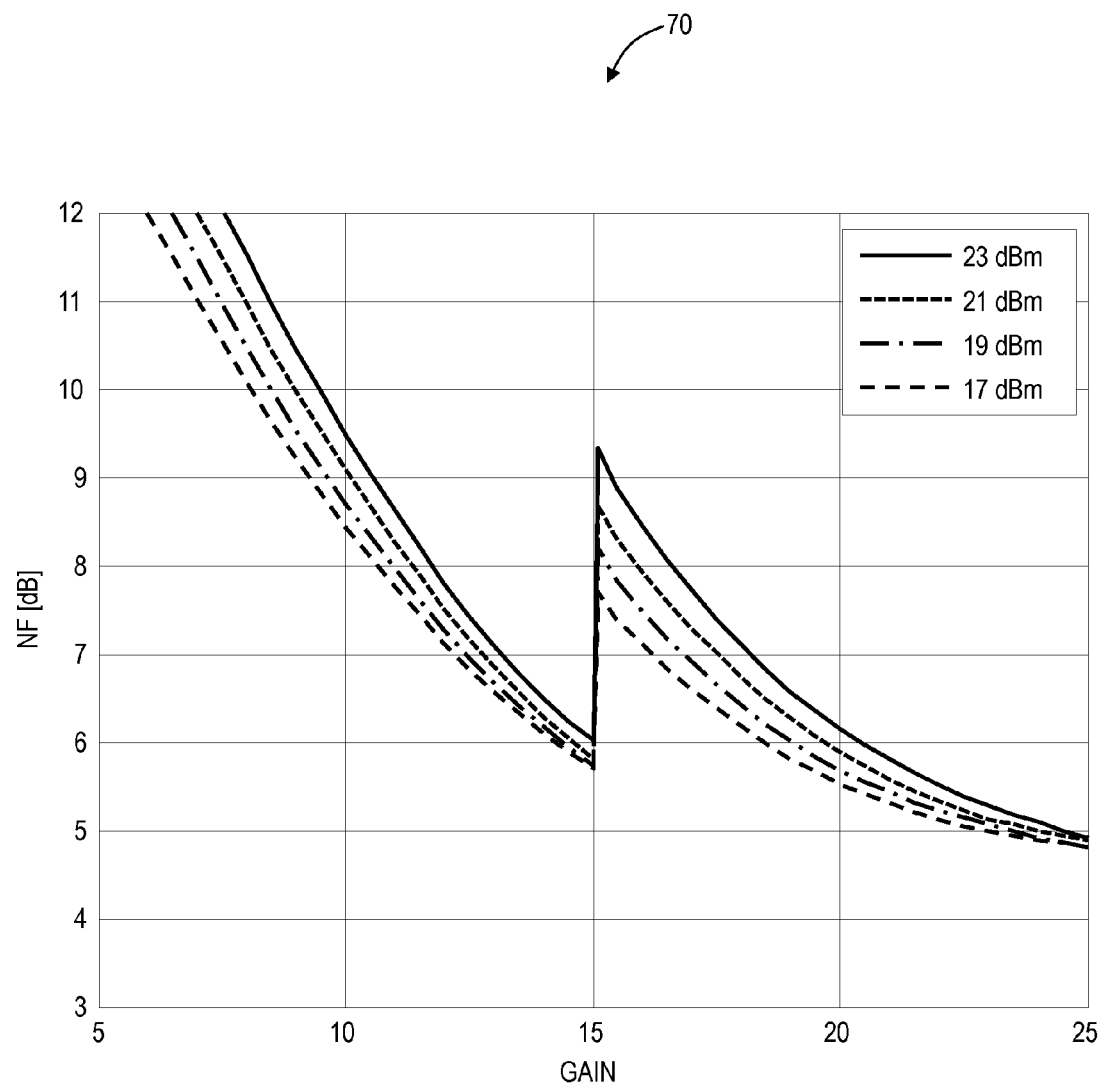
FIG. 4 is a graph of performance of the extended dynamic range optical amplifier of FIG. 1 at different maximum output powers, e.g. 17, 19, 21, and 23 dBm.

Referring to FIG. 4, in an exemplary embodiment, a graph 70 illustrates performance of the extended dynamic range optical amplifier 10 at different maximum output powers, e.g. 17, 19, 21, and 23 dBm. The extended dynamic range optical amplifier 10 can also be optimized in other manners to improve the performance of the amplifier. Typically, amplifiers are designed for a maximum output power limit. This limit is based on a number of channels that the amplifier can support (bandwidth), fiber type (NDSF, large effective area fiber (LEAF), Truewave and variants thereof, etc.), and also the cost/size of the pumps. The maximum launch power of a channel and hence the maximum output power from the amplifier will depend on the fiber type. The launch power is high for large core and high dispersion fibers and low for small core and low dispersion fibers such as Truewave and variants thereof The noise figure of the extended dynamic range optical amplifier 10 depends on the relative gain values of each of the gain stages G1. G2, G3. In cases where the extended dynamic range optical amplifier 10 is unlikely to be operated for the maximum output power, it is possible to improve the noise performance of the extended dynamic range optical amplifier 10 by increasing the gain of the first gain stage G1 and reducing the gain of the second gain stages G2, G3. The graph 70 show the performance of the extended dynamic range optical amplifier 10 at different maximum output powers. In an exemplary embodiment, the amplifier performance can be selected by programming in, such as via the control circuitry of the extended dynamic range optical amplifier 10, an offset based on fiber type and other parameters. The extended dynamic range optical amplifier 10 limits the output power and re-distributes the gain between the first gain stage G1 and the second stages G2, G3 based on the programmed parameter.

Figure 5:
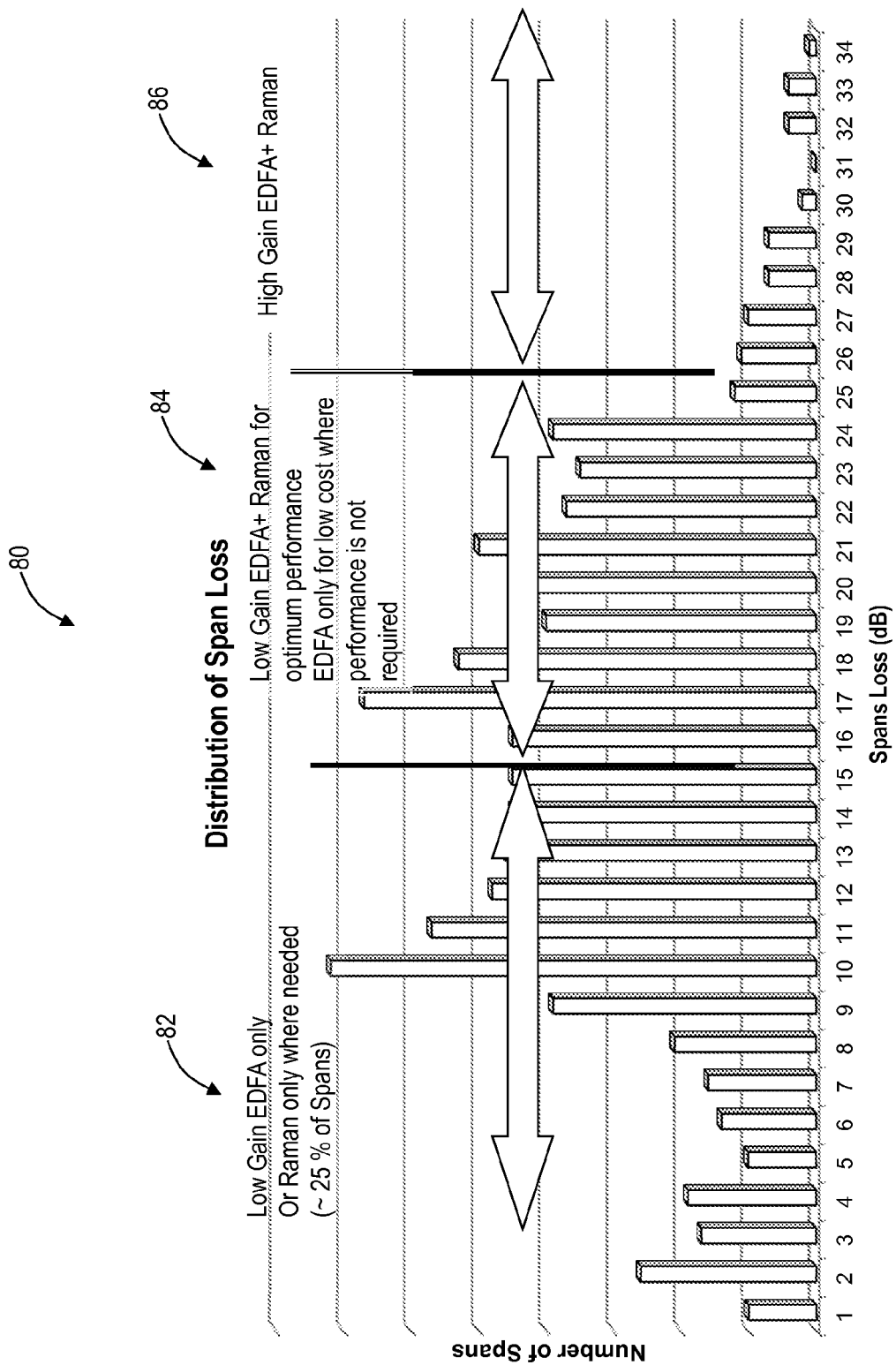
FIG. 5 is a histogram of span loss distribution of various optical spans in an exemplary deployed network.

Referring to FIG. 5, in an exemplary embodiment, a histogram 80 illustrates span loss distribution of various optical spans in an exemplary deployed network. Advantageously, the extended dynamic range optical amplifier 10 reduces the number of amplifier types required in a network. In a typical network, the histogram 80 shows the typical loss distribution of optical fiber spans. In an exemplary embodiment, the extended dynamic range optical amplifier 10 contemplates three operating regimes 82, 84, 86 with different configurations and combinations based thereon. The operating regimes 82, 84, 86 are based on the span loss generally. Advantageously, the extended dynamic range optical amplifier 10 is optimized, based on configuration, across all the span loss variants.

In a first operating regime 82, such as up to 15 dB span loss, the extended dynamic range optical amplifier 10 can be used in the low gain mode of operation by itself Alternatively, the extended dynamic range optical amplifier 10 can be omitted relying solely on Raman amplification. In a second operating regime 84, such as 15-25 dB span loss, the extended dynamic range optical amplifier 10 can be operated in a low gain mode of operation concurrently with Raman amplification or the extended dynamic range optical amplifier 10 can be used by itself in the high gain mode of operation without Raman amplification. As described herein, the extended dynamic range optical amplifier 10 is complimentary with Raman amplifiers. In the second operating regime 84, the extended dynamic range optical amplifier 10 can be used with or without Raman amplifiers with the corresponding mode of the extended dynamic range optical amplifier 10 based on whether Raman amplifiers are present. In the third operating regime 84, the extended dynamic range optical amplifier 10 can be used in the high gain mode of operation along with Raman amplifiers. As described herein, the parameters and configuration of the extended dynamic range optical amplifier 10 can be a function of span loss, fiber type, etc.

Figure 6:
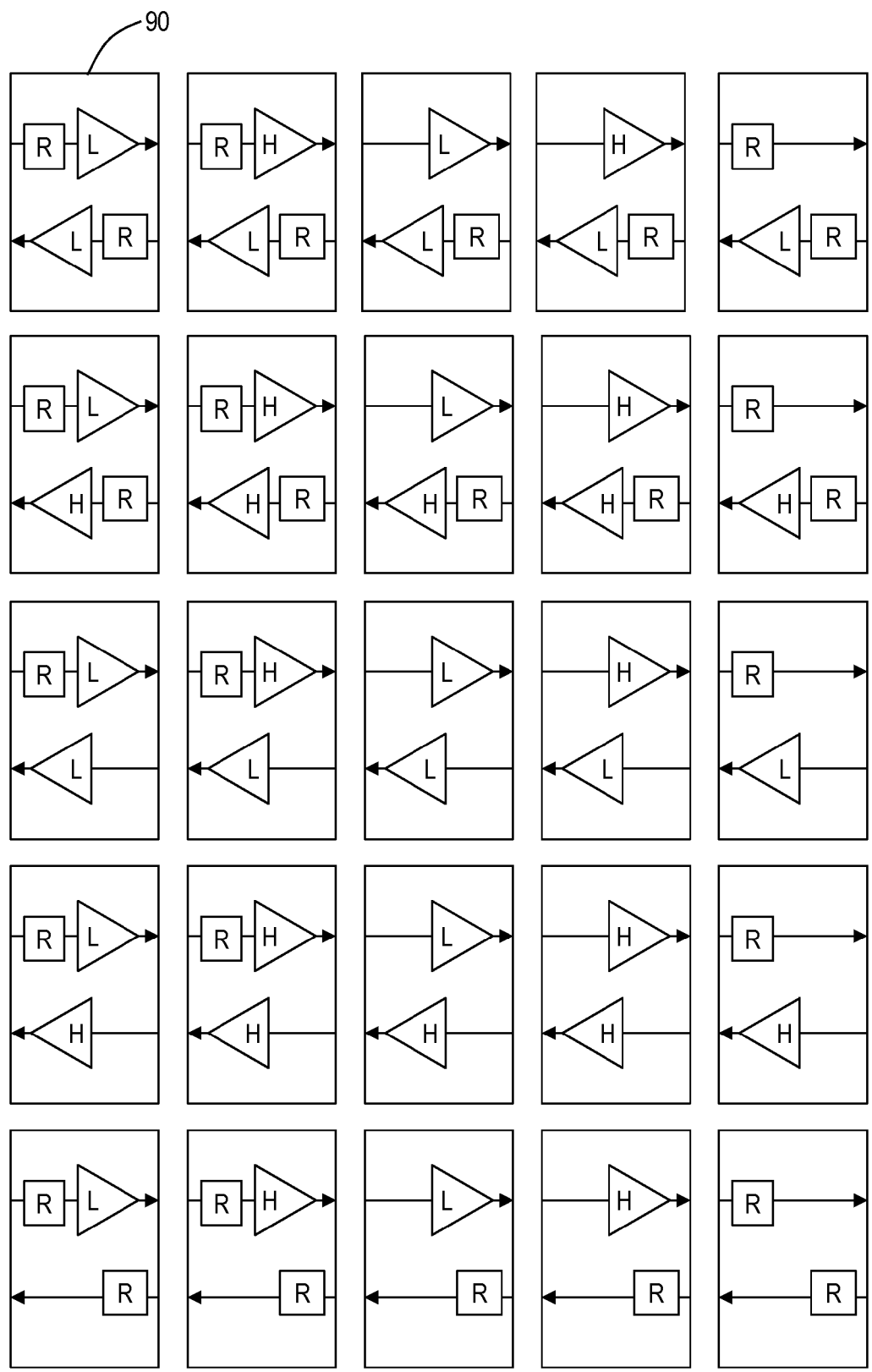
FIG. 6 are block diagrams of various different amplifier module configurations.

Referring to FIG. 6, in an exemplary embodiment, block diagrams illustrate various different amplifier module 90 configurations. For example, the extended dynamic range optical amplifier 10 and conventional EDFAs can be implemented in a module that provides amplification for two fibers, i.e. both directions in a bi-directional system. This is done mainly to reduce the module count and improve packaging density. The different amplifier module 90 configurations illustrate the possible combinations with high gain amplifiers (H), low gain amplifiers (L), and Raman amplifiers (R). As can be seen in FIG. 6, there could be 25 different possible combinations. In conventional systems, this could lead to multiple modules for these various possible combinations. Disadvantageously with conventional systems, having separate high gain amplifiers (H) and low gain amplifiers (L) along with possibly having Raman amplifiers leads to significant numbers of different modules. This creates complexity, sparing issues, engineering concerns, and operational difficulty.

Figure 7:
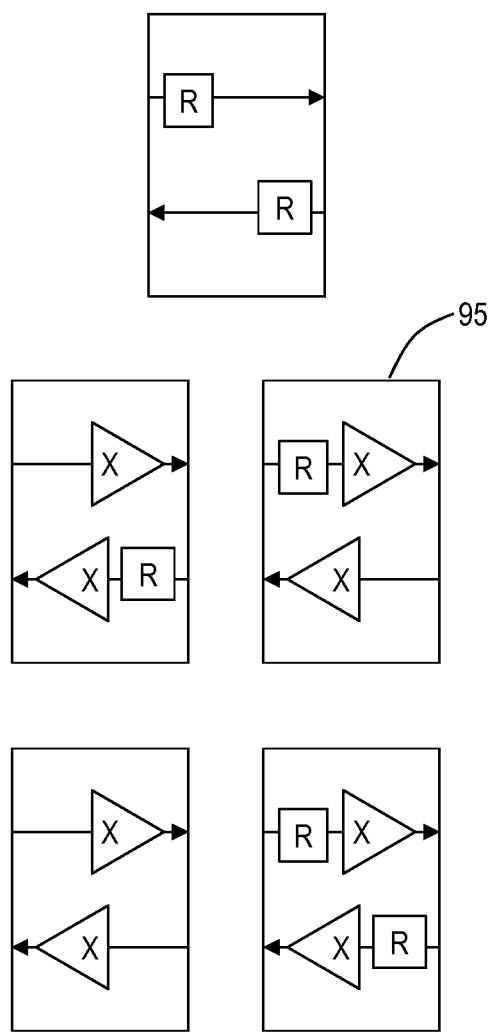
FIG. 7 are block diagrams of various different amplifier module configurations and the associated reduction from the different amplifier module configurations of FIG. 6 through use of the extended dynamic range optical amplifier of FIG. 1.

Referring to FIG. 7, in an exemplary embodiment, block diagrams illustrate various different amplifier module 95 configurations and the associated reduction from the different amplifier module 90 configurations through use of the extended dynamic range optical amplifier 10. With the extended dynamic range optical amplifier 10, network operators can deploy only one type of EDFA module, i.e. the extended dynamic range optical amplifier 10, and separate Raman amplifiers when needed. As noted in the different amplifier module 95 configurations, each module for the extended dynamic range optical amplifier 10 is configurable, denoted as X where X=L for low gain mode or H for high gain mode. This reduces the number of configurations from 25 in FIG. 6 to only 5 in FIG. 7. The extended dynamic range optical amplifier 10 can be a single module used for all operating regimes 82, 84, 86 required in networks with or without Raman amplifiers.

Advantageously, the extended dynamic range optical amplifier 10 provides selectable operating modes providing extended dynamic reach that optimizes the noise performance of the EDFA over a wide dynamic range of span losses. Also, the extended dynamic range optical amplifier 10 provides an ability to optimize and maximize the noise performance of the EDFA and Distributed Raman Amplifiers over a wide range of span loss combinations. The extended dynamic range optical amplifier 10 provides a significant reduction in sparing requirements. Additionally, the extended dynamic range optical amplifier 10 provides an ability to delay deployments of Raman Amplifier in a network. Since the extended dynamic range optical amplifier 10 can be used in high or low span loss, the initial network build can be done with the extended dynamic range optical amplifier 10 only. The network or link can be upgraded with Raman Amplifiers at a later point without sacrificing the performance of the link or the network by switching the extended dynamic range optical amplifier 10 to a low gain mode with the addition of Raman Amplifiers. This allows deferring the cost of Raman amplifiers until a later point where the data rate or channel count requirements require Raman Amplifiers. Also, the extended dynamic range optical amplifier 10 includes an ability to handle large changes in span loss and single Raman failures in the network, by switching modes from low gain to high gain mode. For example, the extended dynamic range optical amplifier 10 can be configured to switch to the high gain mode based on detecting a Raman amplifier failure and being in the low gain mode.

The control circuitry for the operational method 40 and the extended dynamic range optical amplifier 10 can include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An extended dynamic range optical amplifier, comprising:
a first gain stage configured to receive an input signal;
a first optical switch configured to receive an output of the first gain stage and to switch the output of the first gain stage to one of a first output and a second output;
a second gain stage connected to the first output and configured to receive the output of the first gain stage based on a configuration of the first optical switch;
a second optical switch comprising a first input connected to an output of the second gain stage and a second input connected to the second output of the first optical switch, wherein the second optical switch is configured to provide a single output;
a third gain stage configured to receive the single output from the second optical switch; and
control circuitry configured to control operation of the first optical switch, the second optical switch, the first gain stage, the second gain stage, and the third gain stage;
wherein the control circuitry is configured to set the first optical switch and the second optical switch such that the second gain stage is in line with the first gain stage and the third gain stage in a high gain mode of operation and to set the first optical switch and the second optical switch such that the second gain stage is out of line with the first gain stage and the third gain stage in a low gain mode of operation, and wherein the control circuitry is further configured to, responsive to operation in the low gain mode of operation in a cooperative manner with a Raman amplifier, detect a failure of the Raman amplifier and, responsive to the failure of the Raman amplifier, switch to the high gain mode of operation.

2. The extended dynamic range optical amplifier of claim 1, wherein, pursuant to settings of the first optical switch and the second optical switch, the extended dynamic range optical amplifier is configured to operate in a high gain mode of operation and a low gain mode of operation.

3. The extended dynamic range optical amplifier of claim 1, wherein the control circuitry is further configured to:
selectively increase gain associated with the first gain stage and selectively reduce gain associated with the second gain stage and/or the third gain stage when the extended dynamic range optical amplifier is operating below an associated maximum power.

4. The extended dynamic range optical amplifier of claim 1, wherein the control circuitry is further configured to:
select operating parameters of the first optical switch, the second optical switch, the first gain stage, the second gain stage, and the third gain stage with the Raman amplifier.

5. The extended dynamic range optical amplifier of claim 1, further comprising:
a pump in the first gain stage; and
a residual pump bypass from the pump in the first gain stage to the second gain stage, wherein the second gain stage utilizes residual power from the pump in the first gain stage in lieu of having a pump contained therein.

6. The extended dynamic range optical amplifier of claim 1, further comprising:
a variable optical attenuator disposed between the output of the first gain stage and the first optical switch configured to perform selective attenuation.

7. The extended dynamic range optical amplifier of claim 1, further comprising:
a gain flattening filter at an input of the second gain stage configured to incrementally perform gain flattening.

8. The extended dynamic range optical amplifier of claim 1, further comprising:
erbium doped fiber in each of the first gain stage, the second gain stage, and the third gain stage.

9. The extended dynamic range optical amplifier of claim 8, wherein the extended dynamic range optical amplifier comprises a dynamic range of about 5dB to 25dB.

10. A method of operating an extended dynamic range optical amplifier, comprising:
selecting a mode of operation for the extended dynamic range optical amplifier comprising one of a low gain mode and a high gain mode;
responsive to selecting the low gain mode, selectively omitting a second gain stage in the extended dynamic range optical amplifier and amplifying an input signal with a first gain stage and a third gain stage;
responsive to selecting the high gain mode, selectively including the second gain stage between the first gain stage and the second gain stage and amplifying the input signal with each of the first gain stage, the second gain stage, and the third gain stage;
responsive to operation in the low gain mode in a cooperative manner with a Raman amplifier, detecting a failure of the Raman amplifier; and
responsive to the failure of the Raman amplifier, switching to the high gain mode.

11. The method of claim 10, further comprising:
selectively omitting or selectively including the second gain stage via a first optical switch and a second optical switch.

12. The method of claim 10, further comprising:
selectively increasing gain associated with the first gain stage and selectively reducing gain associated with the second gain stage and/or the third gain stage when the extended dynamic range optical amplifier is operating below an associated maximum power.

13. The method of claim 10, further comprising:
operating a pump in the first gain stage; and
in the high gain mode, using residual pump power from the pump for the second gain stage thereby operating the second gain stage without a pump contained therein.

14. A line amplifier configuration, comprising:
an extended dynamic range optical amplifier supporting a first fiber and a second fiber, wherein, for each of the first fiber and the second fiber, the extended dynamic range optical amplifier comprises:
a first gain stage configured to receive an input signal;
a first optical switch configured to receive an output of the first gain stage and to switch the output of the first gain stage to one of a first output and a second output;

a second gain stage connected to the first output and configured to receive the output of the first gain stage based on a configuration of the first optical switch;

a second optical switch comprising a first input connected to an output of the second gain stage and a second input connected to the second output of the first optical switch, wherein the second optical switch is configured to provide a single output; and a third gain stage configured to receive the single output from the second optical switch;

wherein the extended dynamic range optical amplifier is configured to selectively operate in one of a low gain mode and a high gain mode for each of the first fiber and the second fiber; and wherein, in the low gain mode with a Raman amplifier, the extended dynamic range optical amplifier is configured to detect a failure of the Raman amplifier and switch to the high gain mode based thereon.

15. The line amplifier configuration of claim 14, wherein the extended dynamic range optical amplifier is configured based on a first operating regime, a second operating regime, and a third operative regime based on a combination of span loss of each of the first fiber and the second fiber and fiber type of each of the first fiber and the second fiber;

in the first operating regime, the extended dynamic range optical amplifier is operated in the low gain mode without a Raman amplifier;

in the second operating regime, the extended dynamic range optical amplifier is operated in one of the low gain mode with a Raman amplifier and the high gain mode without a Raman amplifier; and in the third operating regime, the extended dynamic range optical amplifier is operated in the high gain mode with a Raman amplifier.

16. The line amplifier configuration of claim 14, wherein, in the high gain mode, the extended dynamic range optical amplifier is configured to utilize residual pump power from the first gain stage for the second gain stage in lieu of having a pump contained therein.

* * * * *